United States Patent
Ohishi et al.

(10) Patent No.: US 10,683,912 B2
(45) Date of Patent: Jun. 16, 2020

(54) PLANETARY GEAR MECHANISM

(71) Applicant: FUJI XEROX CO., LTD., Tokyo (JP)

(72) Inventors: Chigusa Ohishi, Yokohama (JP);
Takanari Matsuda, Yokohama (JP);
Keiji Sasaki, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 23 days.

(21) Appl. No.: 16/077,806

(22) PCT Filed: Jun. 20, 2017

(86) PCT No.: PCT/JP2017/022721
§ 371 (c)(1),
(2) Date: Aug. 14, 2018

(87) PCT Pub. No.: WO2018/003609
PCT Pub. Date: Jan. 4, 2018

(65) Prior Publication Data
US 2019/0063555 A1    Feb. 28, 2019

(30) Foreign Application Priority Data
Jun. 27, 2016 (JP) .................................. 2016-126589

(51) Int. Cl.
*F16H 1/46* (2006.01)
*F16H 1/48* (2006.01)
(Continued)

(52) U.S. Cl.
CPC ................. *F16H 1/48* (2013.01); *F16H 1/46* (2013.01); *F16H 57/02* (2013.01); *F16H 57/08* (2013.01);
(Continued)

(58) Field of Classification Search
CPC ..... F16H 1/43; F16H 1/46; F16H 1/48; F16H 57/02
See application file for complete search history.

(56) References Cited

U.S. PATENT DOCUMENTS 7,523,917 B2 *   4/2009   Arai ...................... F16K 31/04
                                                                251/129.11
8,584,359 B1    11/2013   Bowman
(Continued)

FOREIGN PATENT DOCUMENTS

| JP | H11-037226 A | 2/1999 |
| JP | 2001-295896 A | 10/2001 |
| JP | 2010-216592 A | 9/2010 |

OTHER PUBLICATIONS

Aug. 29, 2017 International Search Report issued in International Patent Application No. PCT/JP2017/022721, (1 page).
(Continued)

*Primary Examiner* — Tisha D Lewis
(74) *Attorney, Agent, or Firm* — Oliff PLC

(57) ABSTRACT

A planetary gear mechanism includes a plurality of planetary gear units each including a sun gear member to be rotationally driven by a driving source, an internal gear member, planetary gear members, and a carrier member, and a case body that internally houses the planetary gear units and includes an inner circumferential surface to be brought into surface contact with outer circumferential surfaces of the internal gear members. Engagement portions having concave shapes or convex shapes that can be fitted to convex shapes or concave shapes formed in the outer circumferential surfaces of the internal gear members are formed in the inner circumferential surface of the case body. The engagement portions are engaged with the convex shapes provided in the outer circumferential surfaces of the internal gear members, from an opposite direction to a rotating direction
(Continued)

of the carrier members, to thereby inhibit the internal gear members from rotating.

10 Claims, 10 Drawing Sheets

(51) Int. Cl.
    *F16H 57/02*     (2012.01)
    *F16H 57/08*     (2006.01)
    *F16H 55/17*     (2006.01)

(52) U.S. Cl.
    CPC .................. *F16H 2055/176* (2013.01); *F16H 2057/02017* (2013.01)

(56) References Cited

U.S. PATENT DOCUMENTS

| | | | | |
|---|---|---|---|---|
| 2007/0201748 A1* | 8/2007 | Bixler | ..................... | B25F 5/001 |
| | | | | 382/225 |
| 2011/0155520 A1* | 6/2011 | Takahashi | ............... | F16D 65/18 |
| | | | | 188/72.6 |

OTHER PUBLICATIONS

Aug. 29, 2017 Written Opinion of the International Searching Authority issued in International Patent Application No. PCT/JP2017/022721, (2 pages).

\* cited by examiner (a)

(b)

(a)

(b)

(a)

(b)

(a)

(b)

(a)

(b)

(a)

(b)

(a)

(b)

PLANETARY GEAR MECHANISM

TECHNICAL FIELD

The present invention relates to a planetary gear mechanism.

BACKGROUND ART

In a multistage planetary gear type speed reducer, a plurality of stages of planetary gear units and ring-like housing cases with internal gears divided correspondingly to the stages of the planetary gear units respectively are disposed coaxially and in parallel so that the housing cases with the internal gears can be combined and coupled with the stages of the planetary gear units respectively. One of such multistage planetary gear type speed reducers has been known as a cylindrical multistage type small-sized planetary gear speed reducer in which an output-shape-side flange portion, a plurality of stages of housing cases, and an input-side end cap portion are arranged continuously, and places where the stages of housing cases, the flange portion and the end cap portion are fitted to one another are fixed by joining/fixing units respectively to be thereby integrated (Patent Document 1).

PRIOR ART DOCUMENTS

Patent Document

Patent Document 1: JP-A-11-37226

SUMMARY OF THE INVENTION

Problem that the Invention is to Solve

At least one exemplary embodiment of the present invention provides a planetary gear mechanism capable of suppressing rotational unevenness and noise.

Means for Solving the Problem

A planetary gear mechanism of a first configuration of the present invention comprises;
a plurality of planetary gear units each including a sun gear member to be rotationally driven by a driving source, an internal gear member, planetary gear members, and a carrier member; and
a case body that internally houses the planetary gear units and includes an inner circumferential surface to be brought into surface contact with outer circumferential surfaces of the internal gear members; wherein:
engagement portions having concave shapes or convex shapes that can be fitted to convex shapes or concave shapes formed in the outer circumferential surfaces of the internal gear members are formed in the inner circumferential surface of the case body.

A second configuration of the present invention is that, in the planetary gear mechanism of the first configuration of the present invention,
the engagement portions are engaged with the convex shapes provided in the outer circumferential surfaces of the internal gear members, from an opposite direction to a rotating direction of the carrier members.

A third configuration of the present invention is that, in the planetary gear mechanism of the first configuration of the present invention,
the engagement portions having the convex shapes have cut and raised shapes or cut and drawn shapes provided with cut grooves, so that the engagement portions can be engaged with the concave shapes provided in the outer circumferential surfaces of the internal gear members to thereby inhibit the internal gear members from rotating.

A fourth configuration of the present invention is that, in the planetary gear mechanism of the third configuration of the present invention,
the cut and raised shapes or the cut and drawn shapes are engaged with the concave shapes provided in the outer circumferential surfaces of the internal gear members, from an opposite direction to a rotating direction of the carrier members, to thereby inhibit the internal gear members from rotating.

A fifth configuration of the present invention is that, in the planetary gear mechanism of the third configuration of the present invention,
the cut and raised shapes or the cut and drawn shapes are engaged with the concave shapes provided in the outer circumferential surfaces of the internal gear members, from both a rotating direction of the carrier members and an opposite direction to the rotating direction, to thereby inhibit the internal gear members from rotating.

A sixth configuration of the present invention is that, in the planetary gear mechanism of any one of the third to fifth configurations of the present invention,
a plurality of the cut and raised shapes or the cut and drawn shapes are formed along the outer circumferential surface of each of the internal gear members.

A seventh configuration of the present invention is that, in the planetary gear mechanism of any one of the third to sixth configurations of the present invention,
the cut and raised shapes or the cut and drawn shapes are formed to be engaged with the concave shapes in different circumferential positions on the outer circumferential surface of each of the internal gear members respectively.

An eighth configuration of the present invention is that, in the planetary gear mechanism of any one of the third to seventh configurations of the present invention,
the cut and raised shapes or the cut and drawn shapes have different cut and raised heights or different cut and drawn heights so that the cut and raised shapes or the cut and drawn shapes can be engaged with the concave shapes provided in the outer circumferential surface of each of the internal gear members respectively.

A ninth configuration of the present invention is that, in the planetary gear mechanism of any one of the third to eighth configurations of the present invention,
each of the internal gear members has through holes that penetrate the internal gear member from the outer circumferential surface thereof to the inner circumferential surface thereof so as to communicate with the cut grooves provided in the cut and raised shapes or the cut and drawn shapes of the case body.

A tenth configuration of the present invention is that, in the planetary gear mechanism of any one of the first to ninth configurations of the present invention,
there is a difference between one of the planetary gear units and another as to at least one of a module, a tooth number and a material.

An eleventh configuration of the present invention is that, in the planetary gear mechanism of any one of the first to tenth configurations of the present invention,
threaded holes through which the case body can be fastened to a mounted body are formed in the case body.

A twelfth configuration of the present invention is that, in the planetary gear mechanism of anyone of the first to eleventh configurations of the present invention, the planetary gear units are housed while being urged in an axial direction of the case body by an urging member.

Effect of the Invention

According to the first configuration of the present invention, it is possible to suppress rotational unevenness and noise.

According to the second configuration of the present invention, it is possible to more surely position the internal gear members in a non-rotatable manner.

According to the third configuration of the present invention, it is possible to surely position the internal gear members in a non-rotatable manner while achieving miniaturization.

According to the fourth configuration of the present invention, it is possible to more surely position the internal gear members in a non-rotatable manner.

According to the fifth configuration of the present invention, it is possible to position the internal gear members in a non-rotatable manner as to the opposite directions.

According to the sixth configuration of the present invention, it is possible to suppress deformation of the case body.

According to the seventh configuration of the present invention, it is possible to suppress deformation of the case body.

According to the eighth configuration of the present invention, it is possible to suppress erroneous assembly of the planetary gear mechanism.

According to the ninth configuration of the present invention, it is possible to supply a lubricant from the outside to the inside of the planetary gear mechanism.

According to the tenth configuration of the present invention, it is possible to set the reduction gear ratio of the planetary gear mechanism in a wider range.

According to the eleventh configuration of the present invention, it is possible to easily mount the planetary gear mechanism on the mounted body.

According to the twelfth configuration of the present invention, it is possible to suppress backlash in the central axial direction of each planetary gear unit.

Figure 2:
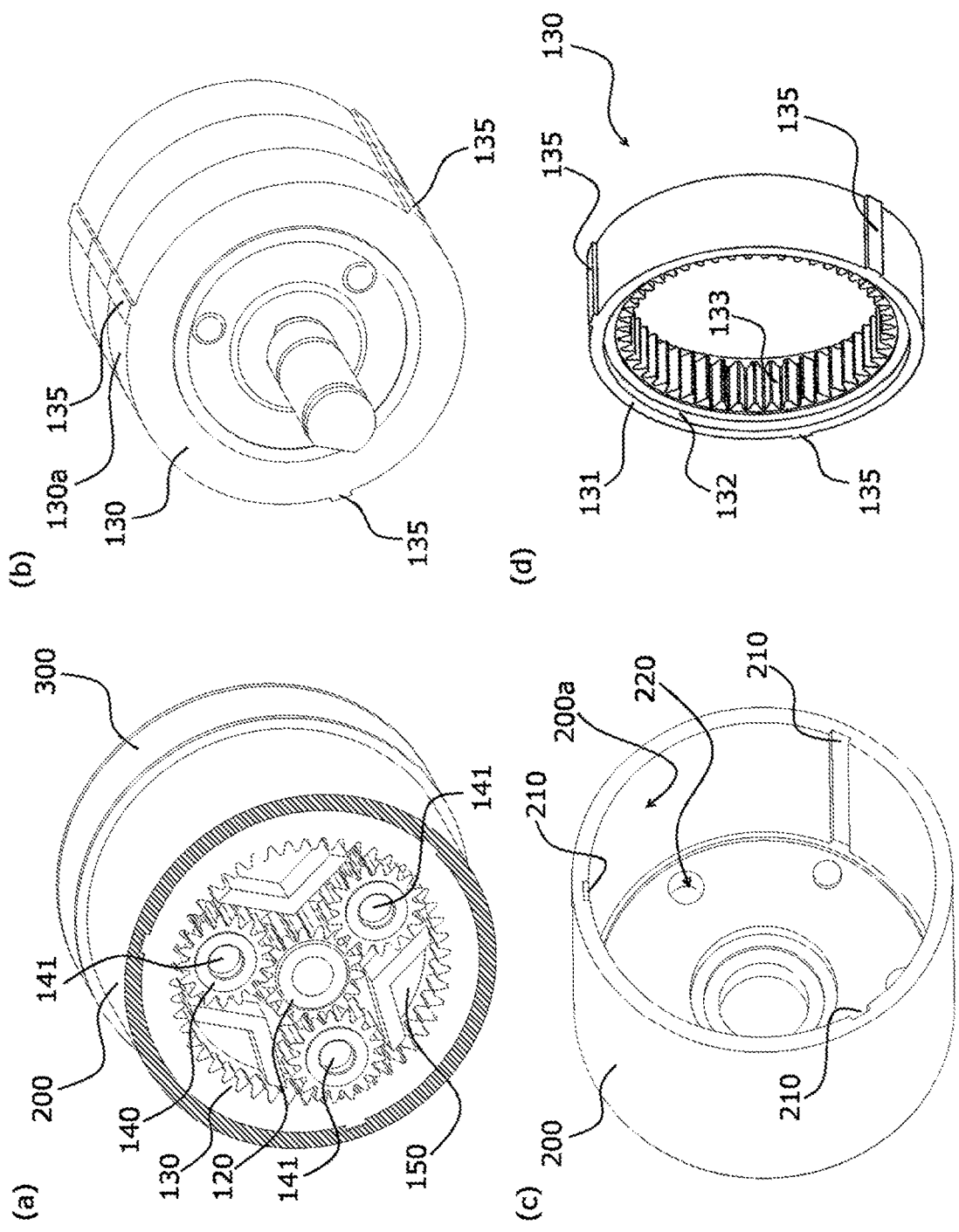

(a) of FIG. 2 is a cross-sectional perspective view of the planetary gear mechanism according to the first exemplary embodiment, (b) of FIG. 2 is a perspective view of planetary gear units, (c) of FIG. 2 is a perspective view illustrating the internal surface side of a case body, and (d) of FIG. 2 is a perspective view of an internal gear member.

Figure 3:
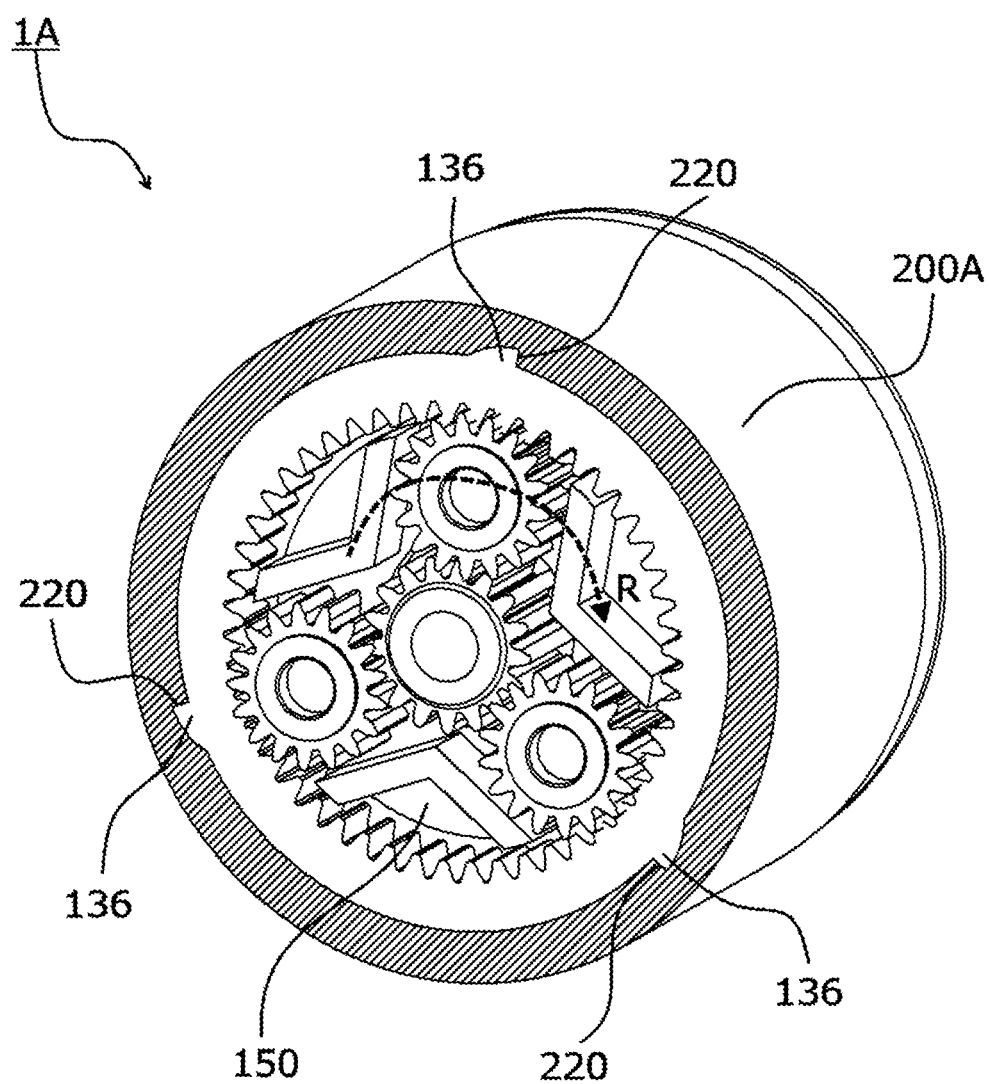

FIG. 3 is a cross-sectional perspective view of a planetary gear mechanism according to a modified example.

Figure 4:
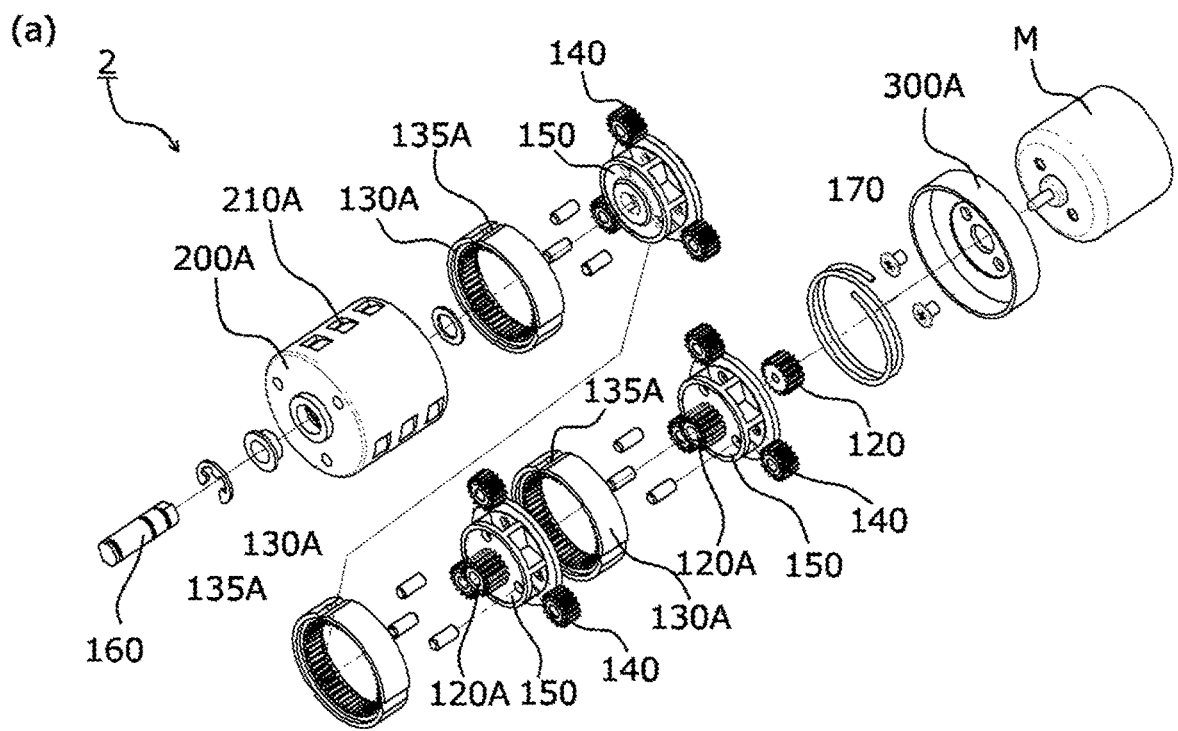
Figure 4:
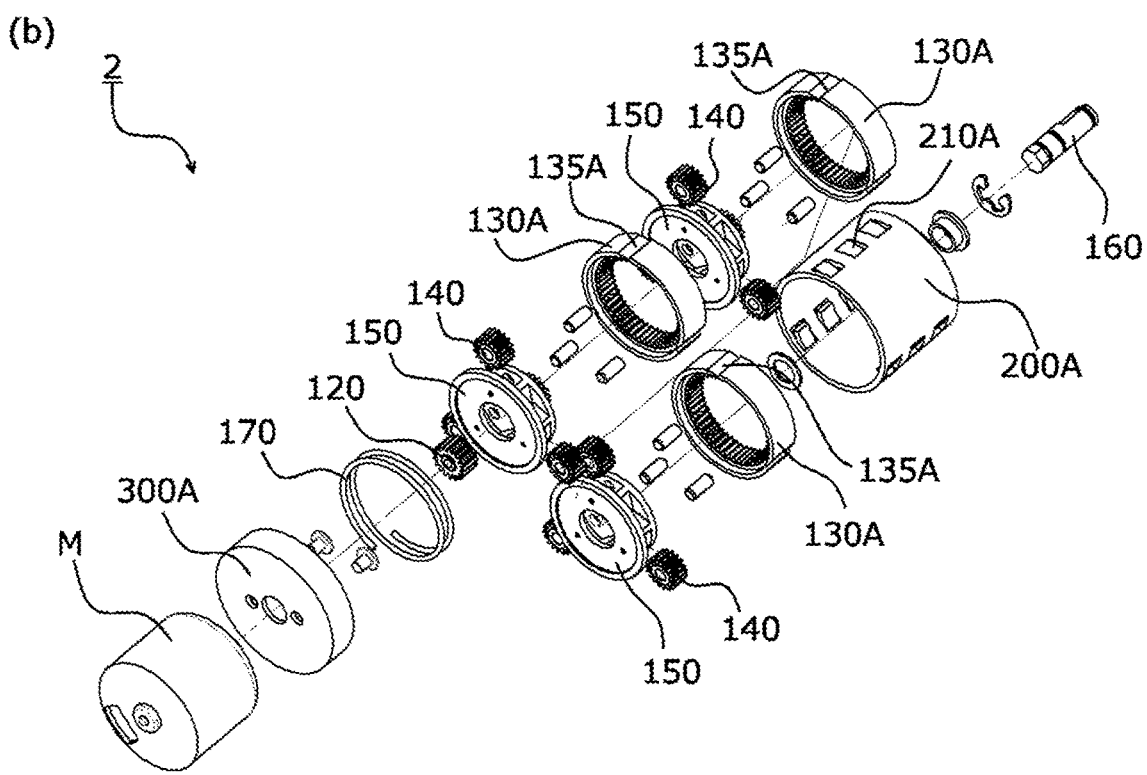

(a) of FIG. 4 is an exploded perspective view of a planetary gear mechanism according to a second exemplary embodiment when the view point is placed on the output shaft side, and (b) of FIG. 4 is an exploded perspective view of the planetary gear mechanism when the view point is placed on the driving source side.

Figure 5:
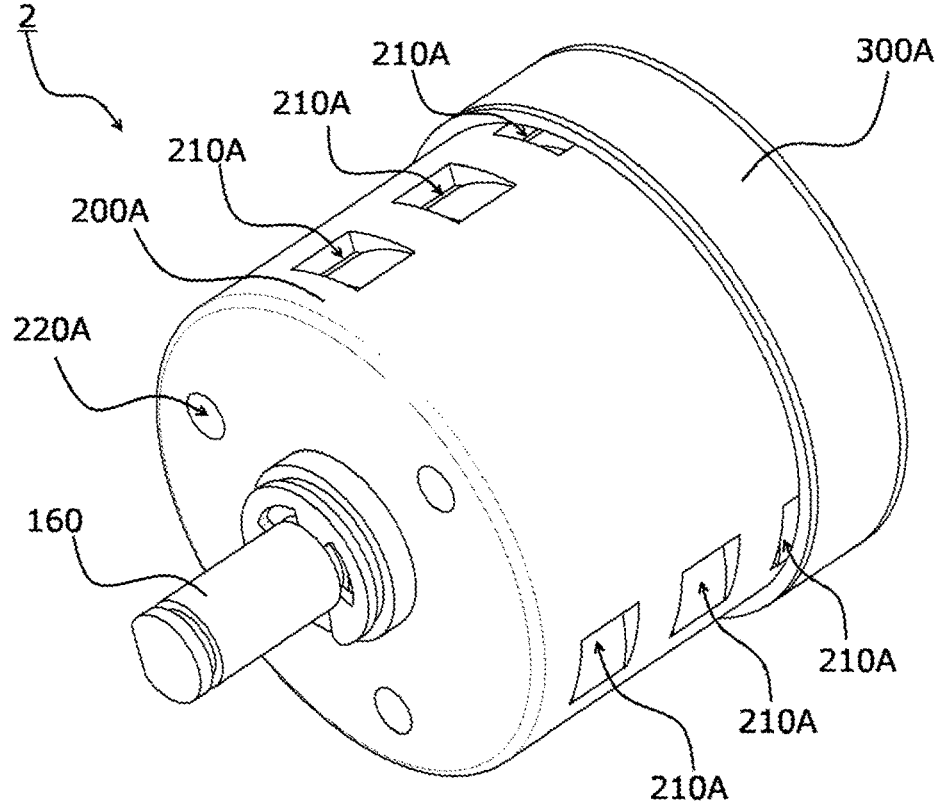
Figure 5:
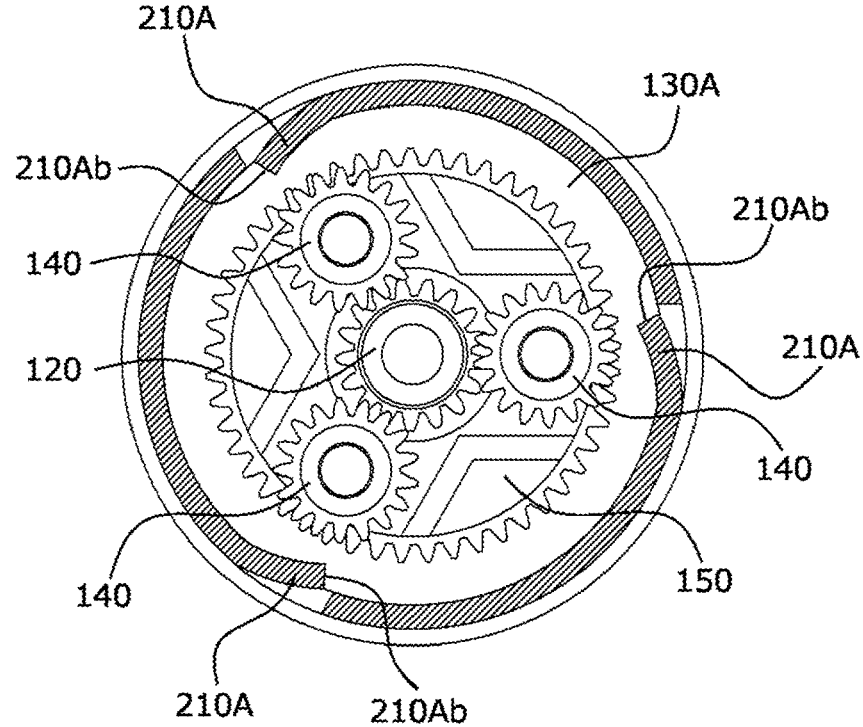

(a) of FIG. 5 is a perspective view of the planetary gear mechanism according to the second exemplary embodiment, and (b) of FIG. 5 is a cross-sectional view of the same.

Figure 6:
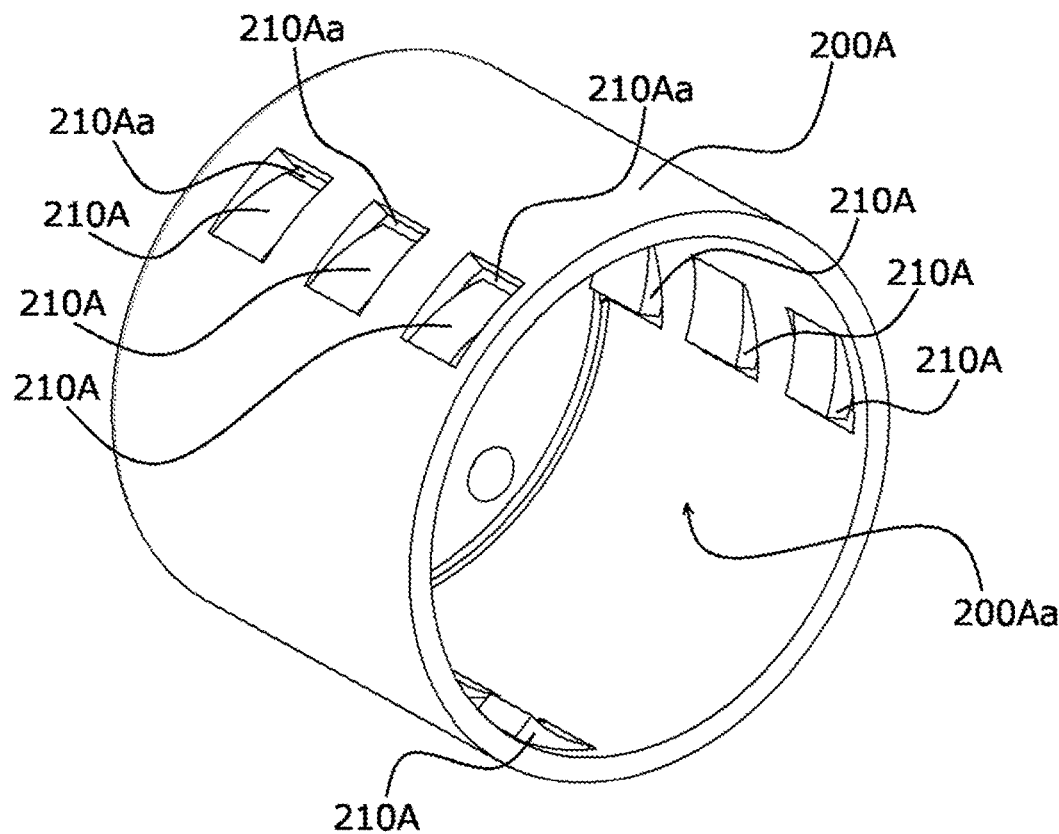
Figure 6:
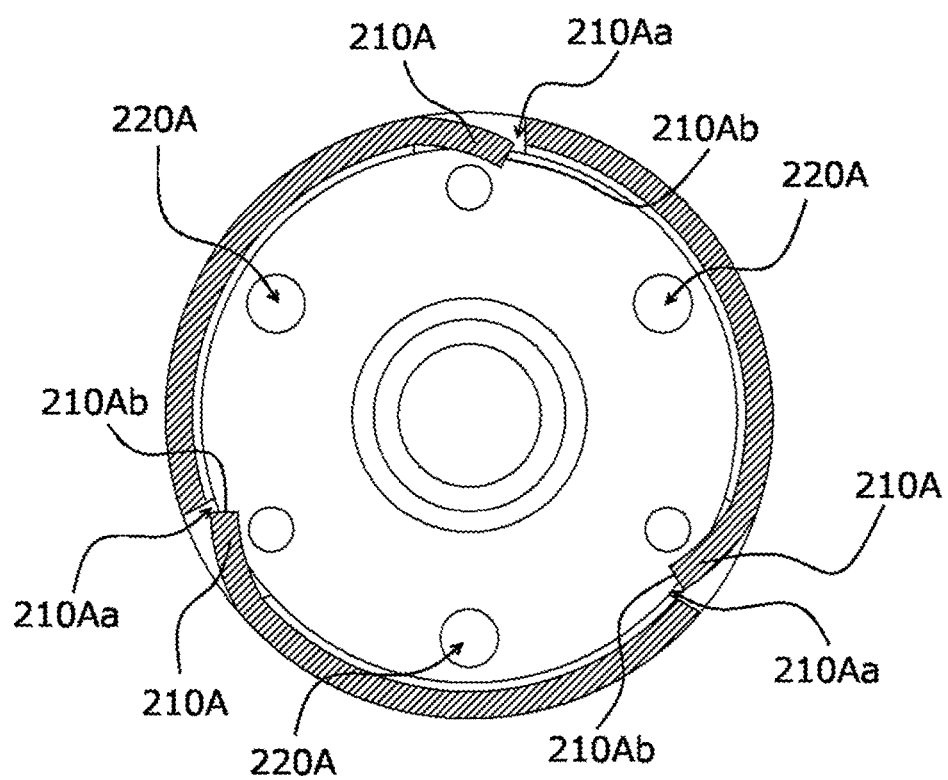

(a) of FIG. 6 is a perspective view illustrating the internal surface side of a case body in the planetary gear mechanism according to the second exemplary embodiment, and (b) of FIG. 6 is a cross-sectional view of the same.

Figure 7:
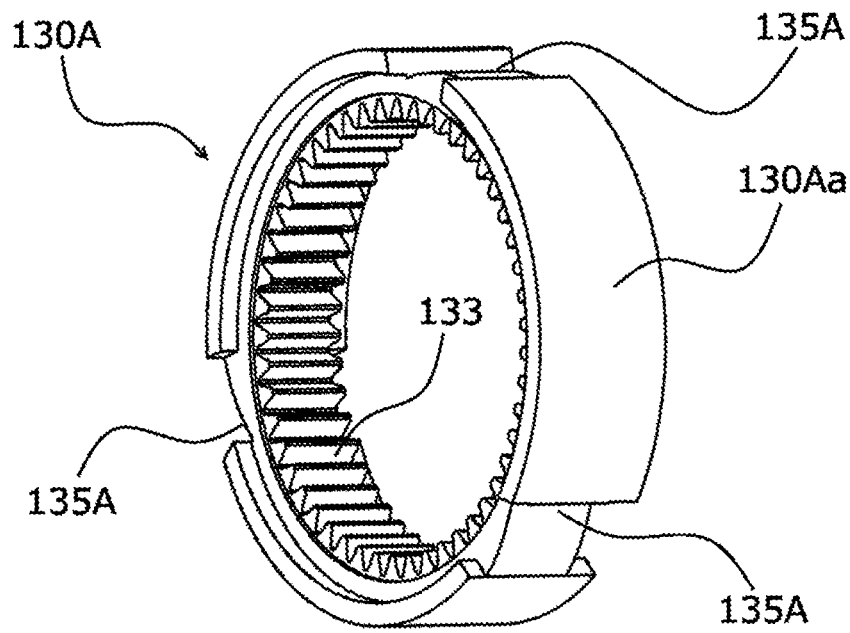
Figure 7:
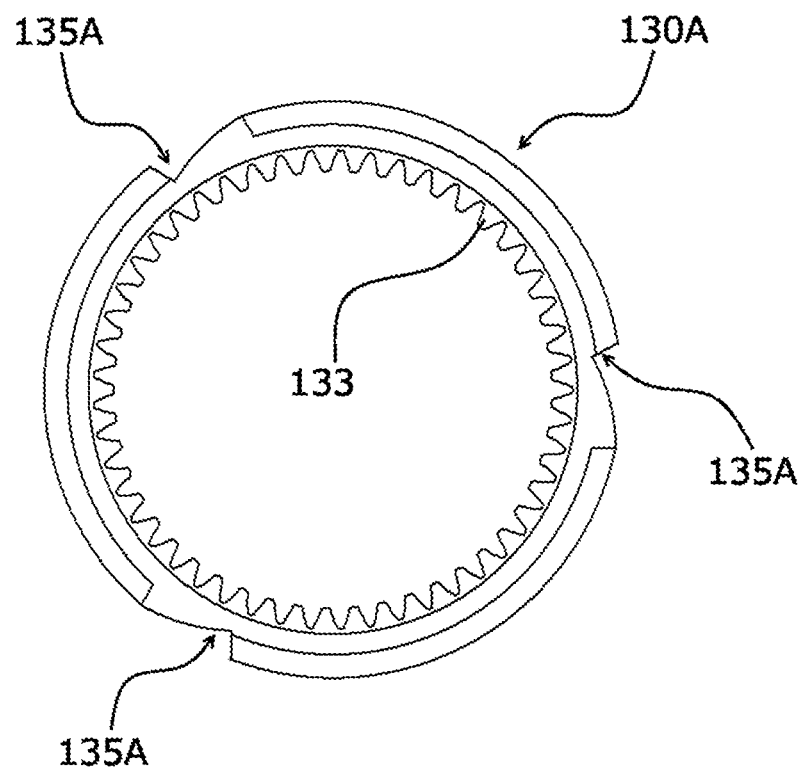

(a) of FIG. 7 is a perspective view of an internal gear member in the planetary gear mechanism according to the second exemplary embodiment, and (b) of FIG. 7 is a side view of the same.

Figure 8:
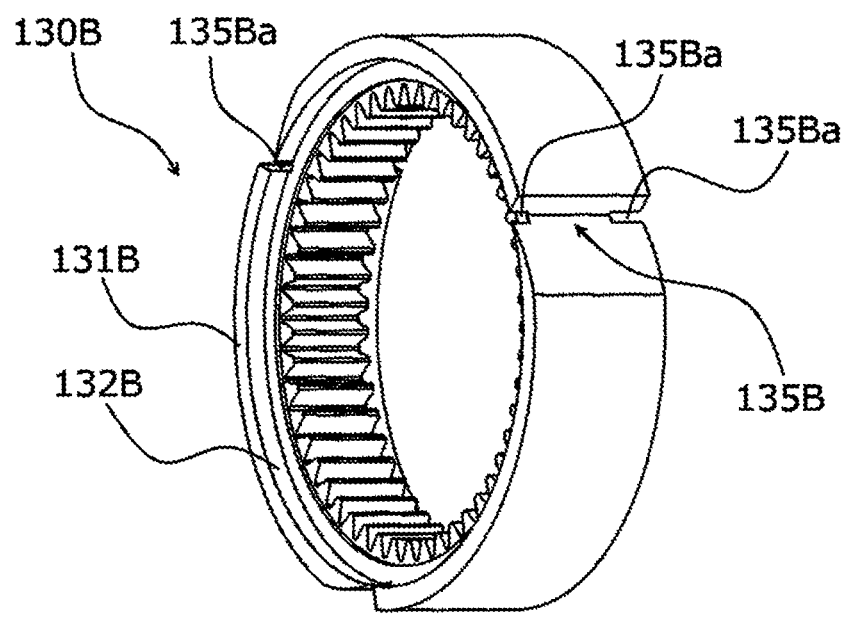
Figure 8:
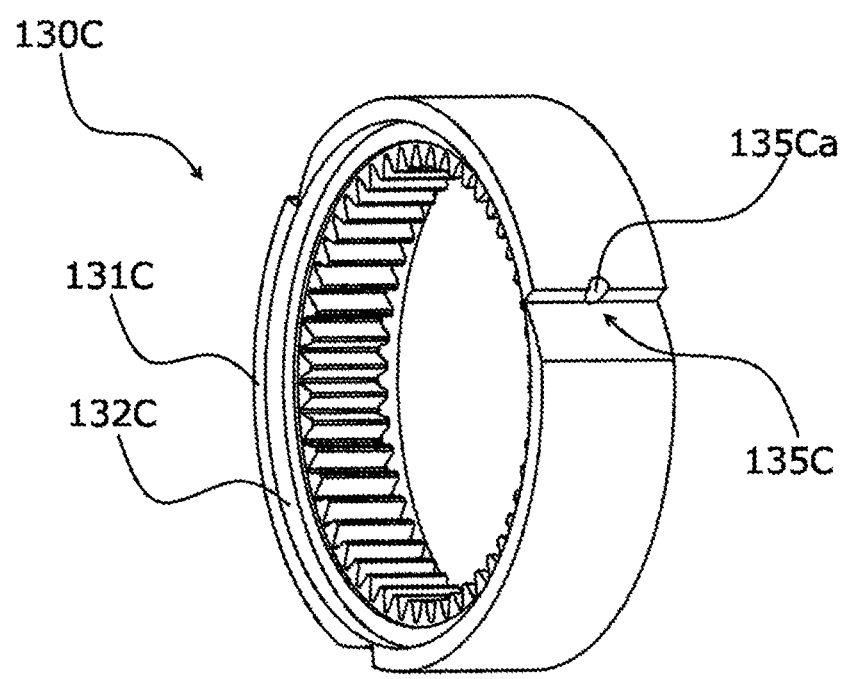

(a) of FIG. 8 and (b) of FIG. 8 are perspective views illustrating internal gear members according to modified examples.

Figure 9:
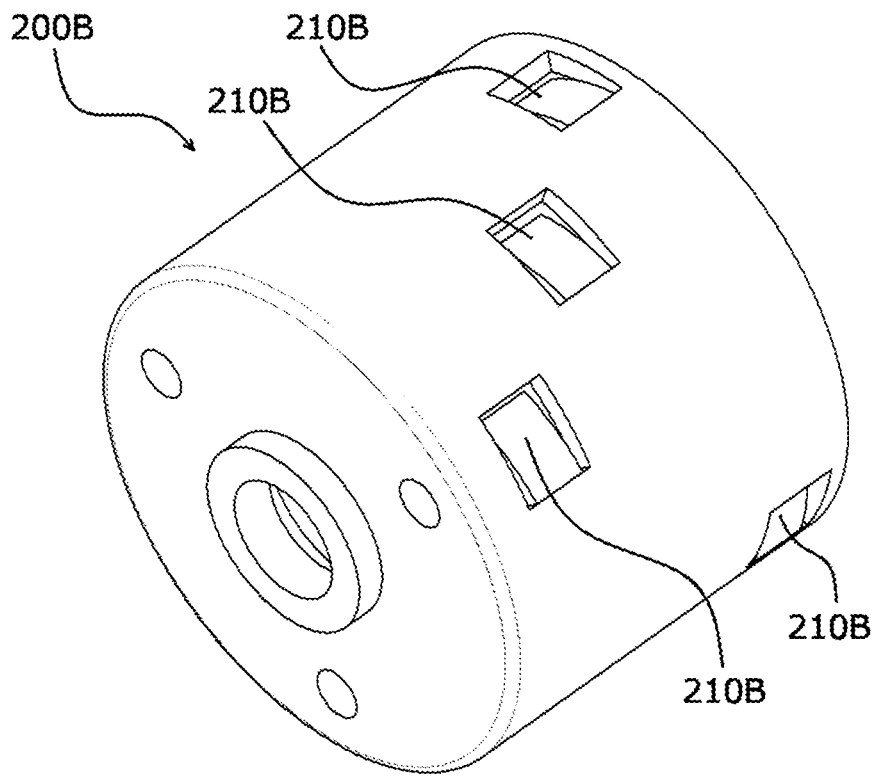
Figure 9:
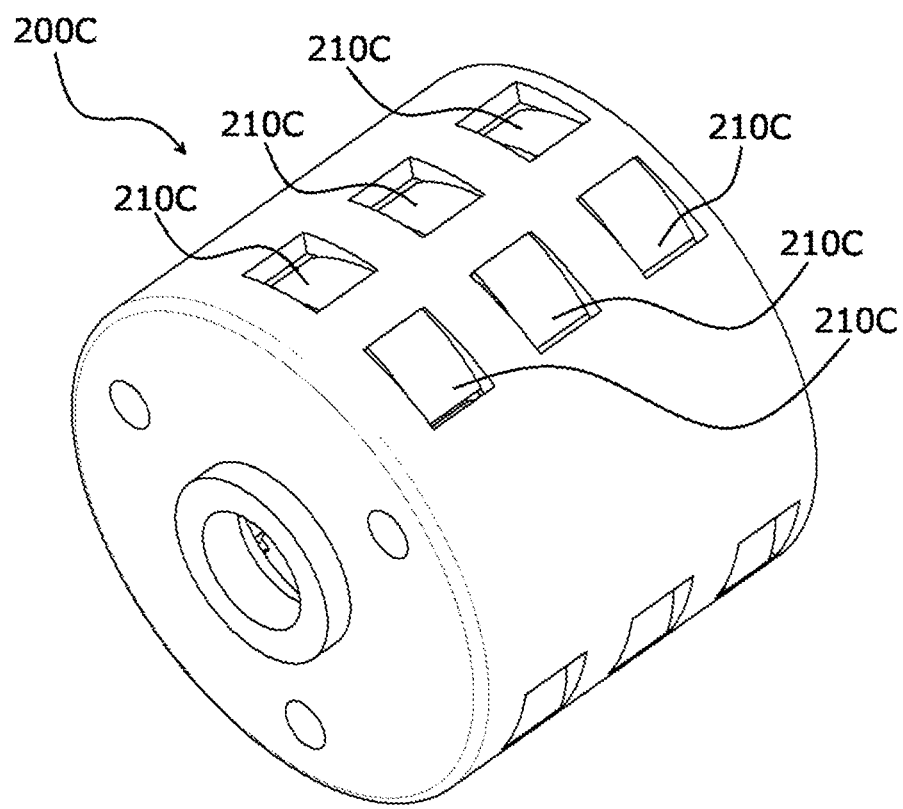

(a) of FIG. 9 and (b) of FIG. 9 are perspective views illustrating case bodies according to modified examples.

Figure 10:
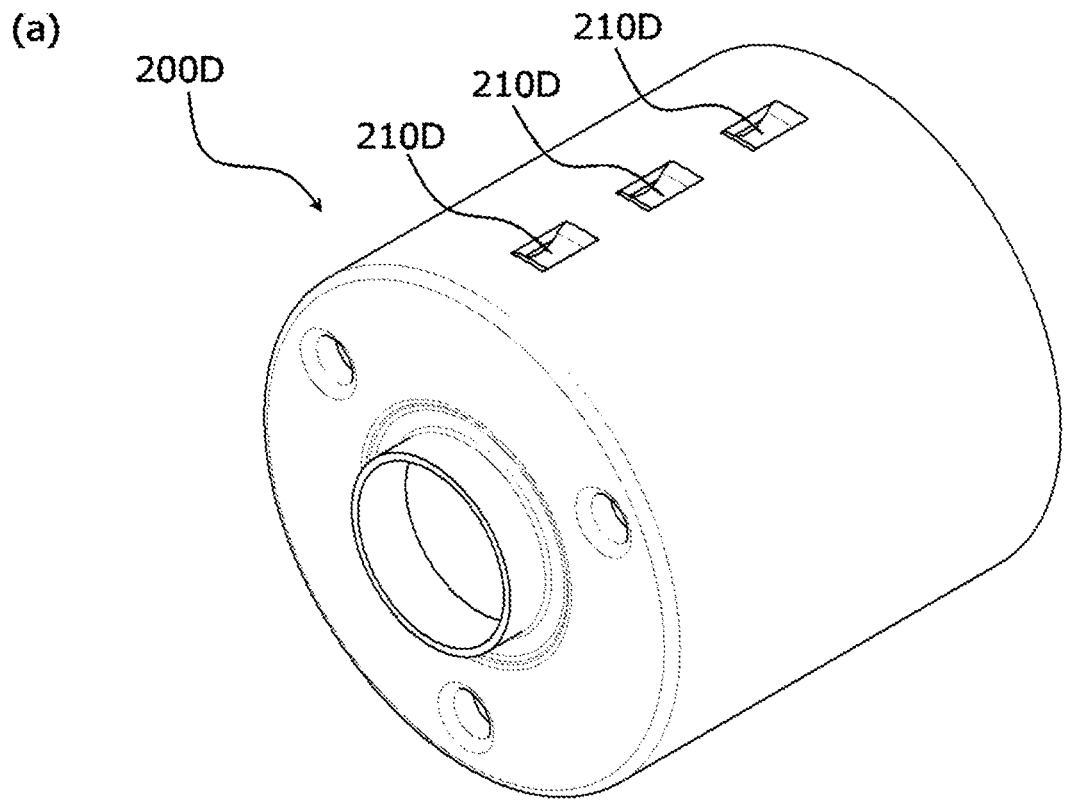
Figure 10:
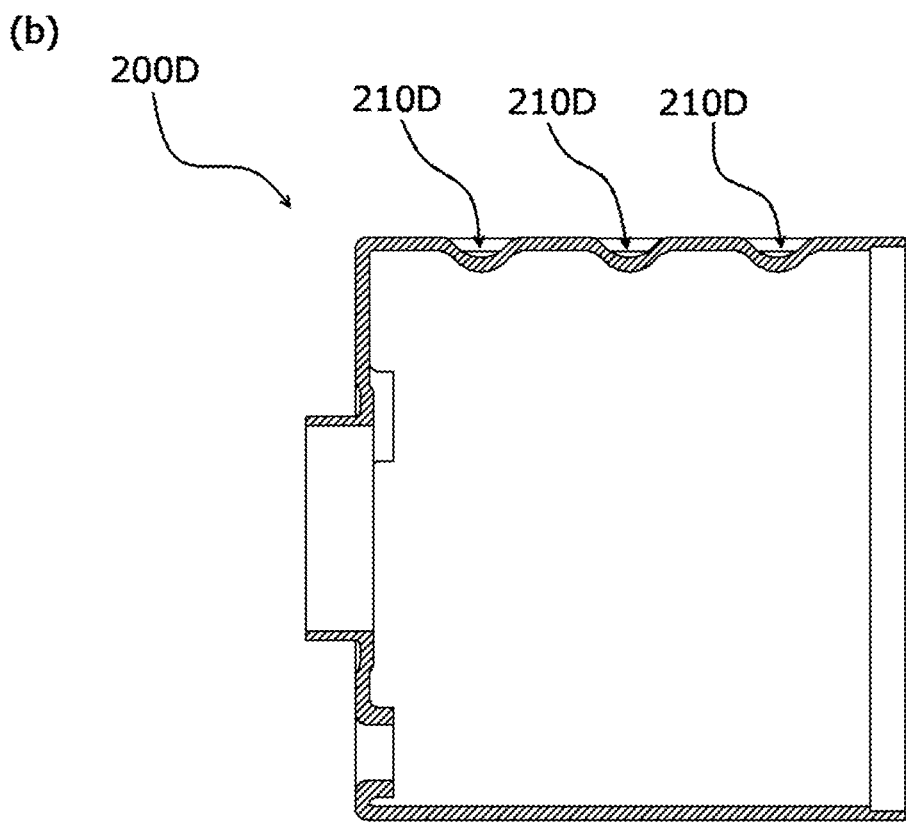

(a) of FIG. 10 is a perspective view illustrating a case body according to another modified example, and (b) of FIG. 10 is a longitudinally sectional view of the same.

MODE FOR CARRYING OUT THE INVENTION

Next, the present invention will be described below more in detail along exemplary embodiments and specific examples with reference to the drawings. However, the present invention is not limited to the exemplary embodiments and the specific examples.

In addition, in the following description using the drawings, it is noted that the drawings are schematic, and ratios among dimensions, etc. are different from actual ones. Any other than members required for making the invention understood easily is suitably omitted from the drawings.

Figure 1:
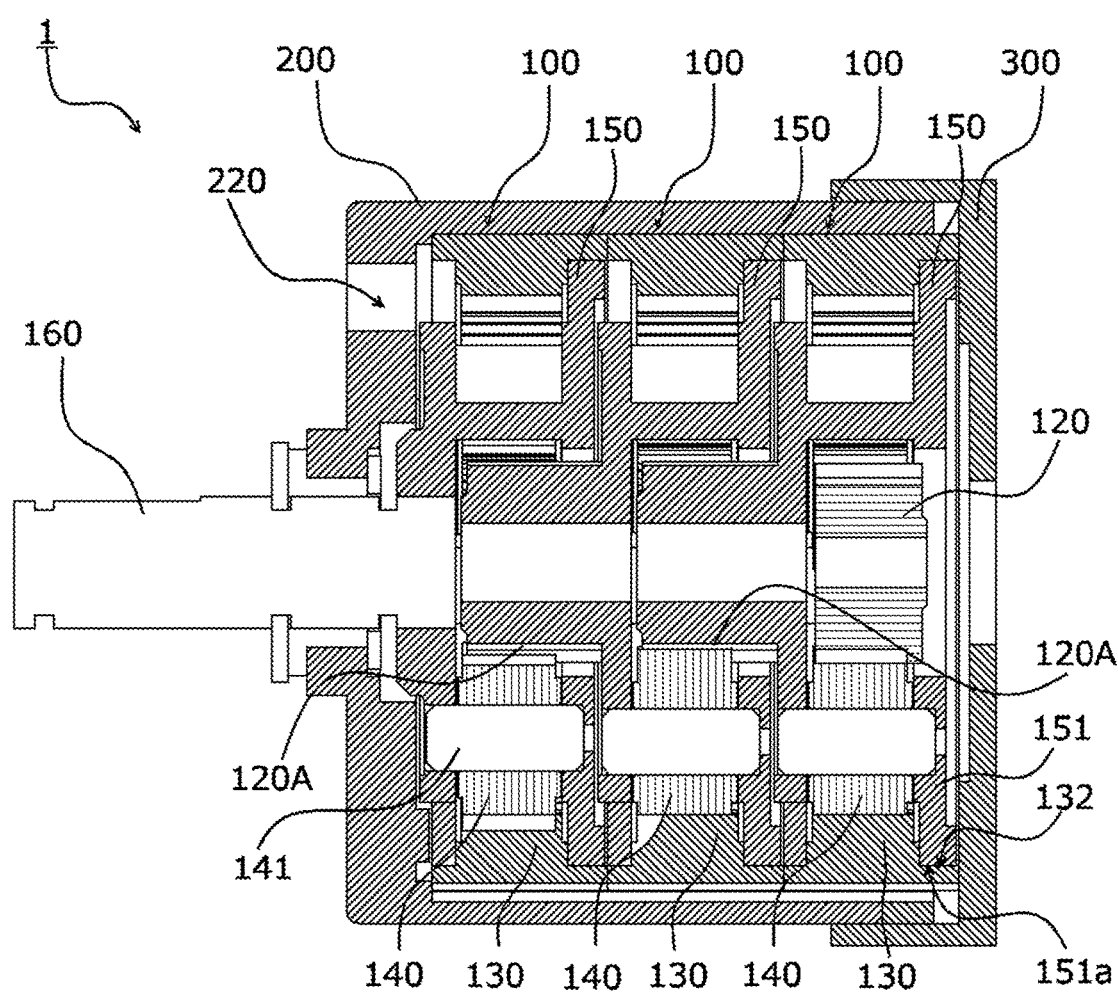
FIG. 1 is a longitudinally sectional view illustrating an example of a planetary gear mechanism according to a first exemplary embodiment.

First Exemplary Embodiment (1) Overall Configuration and Operation of Planetary Gear Mechanism FIG. 1 is a longitudinally sectional view illustrating an example of a planetary gear mechanism 1 according to the exemplary embodiment. (a) of FIG. 2 is a partial cross-sectional perspective view of the planetary gear mechanism 1, (b) of FIG. 2 is a perspective view of planetary gear units 100, (c) of FIG. 2 is a perspective view illustrating the internal surface side of a case body 200, and (d) of FIG. 2 is a perspective view of an internal gear member 130. The overall configuration and operation of the planetary gear mechanism 1 will be described below with reference to the drawings.

(1.1) Overall Configuration of Planetary Gear Mechanism

Although FIG. 1 shows an example having a three-stage configuration in which planetary gear units 100 arranged in one row with three stages are housed, the planetary gear mechanism 1 according to the exemplary embodiment may have a configuration in which a plurality of planetary gear units 100 are overlapped with one another in accordance with a required gear ratio.

As illustrated in FIG. 1, the planetary gear mechanism 1 is constituted by a plurality of planetary gear units 100 each having a sun gear 120 serving as a sun gear member, an internal gear 130 serving as an internal gear member, planetary gears 140 serving as planetary gear members, and a carrier 150 serving as a carrier member, a case body 200 internally housing the planetary gear units 100 overlapped with one another, a lid body 300, and an output shaft 160 fixed to the carrier 150 of the planetary gear unit 100 in the final stage.

The sun gear 120 is connected to a motor M (see FIG. 4), which serves as a driving source, on the central axis of the planetary gear unit 100, so that the driving force of the motor M can be transmitted to the planetary gears 140 which are rotatably supported on the carrier 150.

The planetary gears 140 are rotatably supported at three circumferential places of the carrier 150 and at equal intervals by support shafts 141 so that the planetary gears 140 can be rotationally driven to rotate by the sun gear 120 engaged therewith while the planetary gears 140 are engaged with internal teeth 133 formed in the internal surface of the internal gear 130 so as to revolve with the carrier 150 around the central axis.

The internal gear 130 is constituted by a cylinder 131 having a cylindrical shape with a hollow portion as a whole, and internal teeth 133 formed in a central portion of an internal surface 132 of the cylinder 131. The internal surface 132 where the internal teeth 133 are formed has a cylindrical shape on either side. A circumferential edge portion 151a of a disc portion 151 of the carrier 150 abuts against one end side of the internal surface 132 so that the internal gear 130 can rotatably support the carrier 150 from the outside.

The output shaft 160 is fixed to the carrier 150 of the planetary gear unit 100 in the final stage, and rotatably supported through a bearing 161 on one surface side of the case body 200 so that the rotationally driving force reduced by the planetary gear units 100 can be transmitted to a driven body.

The case body 200 houses the planetary gear units 100 in a non-rotatable manner in which an internal surface 200a is in surface contact with an outer circumferential surface 131a of the internal gear 130 so as to position the planetary gear units 100 with respect to the central axis.

Threaded holes 220 for fastening the planetary gear mechanism 1 to a mounted body are formed on the output shaft 160 side of the case body 200. The other end side of the case body 200 is closed by the lid body 300 while the housed planetary gear units 100 are urged by the spring 170 which serves as an urging member for urging the planetary gear units 100 in the central axial direction.

The sun gears 120, the internal gears 130, the planetary gears 140, the carriers 150, the case body 200 and the cover lid 300 of the planetary gear mechanism 1 are made of moldings using a synthetic resin material. The synthetic resin material may be POM (polyacetale), PA (polyamide), PC (polycarbonate), PET (polyethylene terephthalate), PPS (polyphenylene sulfide), LCP (liquid crystal polymer), or a reinforced synthetic resin in which glass fiber or carbon fiber is added to such a synthetic resin.

In each planetary gear mechanism 1 configured thus, the modules and the number of teeth of the internal teeth 133, the planetary gears 140 and the sun gear 120 may be selected desirably within each of the planetary gear units 100 as long as the internal gear 130 is formed to be housed in the inner circumferential surface 200a of the case body 200.

(1.2) Operation

When the sun gear 120 is rotationally driven by driving of the motor M, each of the three planetary gears 140 rotates around its own support shaft 141 as the center of rotation. In addition, each of the three planetary gears 140 revolves around the central axis because each of planetary gear 140 is engaged with the internal teeth 133 of the internal gear 130.

When the three planetary gears 140 begin to revolve, the carrier 150 supporting the planetary gears 140 is supported by the internal surface 132 of the internal gear 130 in contact therewith. Thus, the carrier 150 begins to rotate at a reduced speed relative to the rotation of the sun gear 120.

When a plurality of stages (three stages in the example of FIG. 1) of planetary gear units 100 are overlapped as illustrated in FIG. 1, a sun gear 120A provided on the external surface of the carrier 150 rotates at a reduced speed and serves as an input to the second-stage planetary gear unit 100.

In the second-stage planetary gear unit 100, second-stage planetary gears 140 engaged with a second-stage internal gear 130 and the second-stage sun gear 120A are supported by a second-stage carrier 150, so as to rotate while revolving around the outer circumference of the second-stage sun gear 120A. Then, the second-stage carrier 150 supporting the revolving planetary gears 140 rotates at a reduced speed.

A sun gear 120A is provided on the external surface of the second-stage carrier 150 rotating at the reduced speed. Third-stage planetary gears 140 engaged with a third-stage internal gear 130 and the third-stage sun gear 120A are supported by a third-stage carrier 150, so as to rotate while revolving around the outer circumference of the third-stage sun gear 120A. The output shaft 160 is fixed to the external surface of the third-stage carrier 150 supporting the revolving planetary gears 140. Thus, the rotation reduced in the three stages is transmitted to the output shaft 160 so as to rotationally drive the driven body.

(2) Structure for Positioning Planetary Gear Units

As illustrated in FIG. 2, engagement convex portions 135 serving as convex shapes are formed at three places circumferentially on an outer circumferential surface 130a of the internal gear 130 of each planetary gear unit 100.

In the case body 200 internally housing the planetary gear units 100, engagement concave portions 210 serving as concave shapes are formed at three places in the inner circumferential surface 200a of the case body 200.

The inner circumferential surface 200a of the case body 200 is in surface contact with the outer circumferential surfaces 130a of the internal gears 130 so as to position the planetary gear units 100 with respect to the central axis. In this state, as illustrated in (a) of FIG. 2, the engagement convex portions 135 and the engagement concave portions 210 are engaged with each other as complementary shapes respectively. Thus, the internal gears 130 are positioned relatively to the case body 200 in a non-rotatable manner.

It is therefore possible to suppress deformation of the internal gears 130. In addition, it is possible to suppress a phase shift among the internal gears 130 of the planetary gear units 100 overlapped with one another. As a result, it is possible to suppress rotational unevenness and noise in the planetary gear mechanism 1.

Modified Example

FIG. 3 is a cross-sectional perspective view of a planetary gear mechanism 1A according to a modified example.

As illustrated in FIG. 3, engagement concave portions 220 serving as concave shapes are formed in a case body 200A in the planetary gear mechanism 1A. The engagement concave portions 220 are engaged with engagement convex portions 136 provided as convex shapes on an outer circumferential surface 130Aa of each internal gear 130A, from an opposite direction (see the illustrated arrow R) to the rotating direction of a carrier 150, so that the internal gear 130A can be positioned in a non-rotatable manner.

As a result, the internal gear 130A is more surely positioned in a non-rotatable manner. Thus, it is possible to suppress rotational unevenness and noise in the planetary gear mechanism 1A.

Second Exemplary Embodiment (a) of FIG. 4 is an exploded perspective view of a planetary gear mechanism 2 according to this exemplary embodiment when the view point is placed on the output shaft side thereof, and (b) of FIG. 4 is an exploded perspective view of the planetary gear mechanism 2 when the view point is placed on the driving source side. (a) of FIG. 5 is a perspective view of the planetary gear mechanism 2 according to the exemplary embodiment, and (b) of FIG. 5 is a cross-sectional view of the same. (a) of FIG. 6 is a perspective view illustrating the internal surface side of a case body 200A in the planetary gear mechanism 2 according to the exemplary embodiment, and (b) of FIG. 6 is a cross-sectional view of the same. (a) of FIG. 7 is a perspective view of an internal gear 130A in the planetary gear mechanism 2 according to the exemplary embodiment, and (b) of FIG. 7 is a side view of the same.

The configuration and operation of the planetary gear mechanism 2 will be described below with reference to the drawings. Constituent elements same as those of the planetary gear mechanism 1 according to the first exemplary embodiment have the same numbers, and detailed description thereof will be omitted.

(1) Overall Configuration and Operation of Planetary Gear Mechanism (1.1) Overall Configuration of Planetary Gear Mechanism As illustrated in FIG. 4, the planetary gear mechanism 2 is constituted by a plurality of planetary gear units 100A each having a sun gear 120, an internal gear 130A, planetary gears 140 and a carrier 150, a case body 200A internally housing the planetary gear units 100A overlapped with one another, a spring 170 urging the planetary gear units 100A in the central axial direction within the case body 200A, and a lid body 300A.

A motor M serving as a driving source is connected to the lid body 300A serving as the input side of the driving force, so as to rotationally drive the sun gear 120 of the first-stage planetary gear unit 100A. Threaded holes 220A are formed on the output shaft 160 side of the case body 200A so that the planetary gear mechanism 2 can be fastened to a mounted body.

As illustrated sectionally in (b) of FIG. 5, the planetary gears 140 are rotatably supported around the sun gear 120 at three circumferential places of the carrier 150 and at equal intervals by support shafts 141, and engaged with internal teeth 133 formed in an internal surface 132 of the internal gear 130A.

The internal gear 130A is positioned in the case body 200A when an outer circumferential surface 130Aa of a cylinder 131A having a cylindrical shape is in surface contact with an inner circumferential surface 200Aa of the case body 200A.

In the internal gear 130A, engagement concave portions 135A serving as concave shapes are formed at three places circumferentially in the outer circumferential surface 130Aa. In the inner circumferential surface 200Aa of the case body 200A, engagement convex portions 210A serving as cut and raised shapes are formed at three places. The engagement convex portions 210A are engaged with the engagement concave portions 135A of each internal gear 130A so that the internal gear 130A can be retained in a non-rotatable manner relatively to the case body 200A.

(1.2) Case Body

As illustrated in (a) of FIG. 6, the engagement convex portions 210A serving as cut and raised shapes from the external surface side toward the inner circumferential surface 200Aa are formed at three places circumferentially in the case body 200A correspondingly to the engagement concave portions 135A of the internal gear 130A in each of the planetary gear units 100A.

The engagement convex portions 210A are formed in such a manner that cut grooves 210Aa are formed in the external surface of the case body 200A made of metal, and the external surface of the case body 200A is cut and raised therefrom. Front end portions 210Ab of the cut and raised engagement convex portions 210A are engaged with the engagement concave portions 135A of each internal gear 130A, which will be described later, from an opposite direction to the rotating direction of the carrier 150. Thus, in spite of miniaturization of the planetary gear mechanism 2, the internal gear 130A can be inhibited from rotating.

Modified Example 1

(a) and (b) of FIG. 9 are perspective views illustrating case bodies 200B and 200C according to modified examples. In the case body 200B, engagement convex portions 210B are formed to be engaged with the engagement concave portions 135A of the internal gears 130A at different circumferential positions respectively.

As a result, the reaction force acting on the case body 200B when the engagement convex portions 210B inhibit the internal gears 130A from rotating can be distributed in the central axis direction to suppress deformation of the case body 200B. Thus, it is possible to suppress rotational unevenness and noise.

In the case body 200C, engagement convex portions 210C are formed to be engaged with the engagement concave portions 135A of each internal gear 130A respectively from both the rotating direction of the carrier 150 and the opposite direction to the rotating direction. As a result, the internal gear 130C can be inhibited from rotating in the two directions, without replacing the case body 200C.

Modified Example 2

(a) of FIG. 10 is a perspective view illustrating a case body 200D according to another modified example, and (b) of FIG. 10 is a longitudinally sectional view of the same. In the case body 200D, engagement convex portions 210D as cut and drawn shapes from the external surface side toward an inner circumferential surface 200Da are formed along the central axis.

The engagement convex portions 210D are, for example, formed by drawing with a press mold. In comparison with the cut and raised shapes, the engagement convex portions 210D are so high in strength that they can be suitably used in a planetary gear mechanism generating a large rotational driving force.

The engagement convex portions 210A, 210B and 210C formed as cut and raised shapes in the case bodies 200A, 200B and 200C, and the engagement convex portions 210D formed as cut and drawn shapes in the case body 200D are preferably formed with different cut and raised heights or different cut and drawn heights, with which the engagement convex portions 210A, 210B, 210C and 210D can be engaged with the engagement concave portions 135A, 135B, 135C and 135D provided in the internal gears 130A, 130B, 130C and 130D respectively.

Due to the different cut and raised heights or the different cut and drawn heights, erroneous assembly can be suppressed when the planetary gear mechanism 2 is assembled.

(1.3) Internal Gear

As illustrated in (a) of FIG. 7, engagement concave portions 135A as concave shapes are formed at three places circumferentially on an outer circumferential surface 130Aa of the internal gear 130A.

In each engagement concave portion 135A, a step portion 135Aa is formed in the rotating direction of the carrier 150 so that a front end portion 210Ab of an engagement convex portion 210A formed in the case body 200A can be engaged therewith to inhibit the internal gear 130A from rotating.

Modified Examples (a) and (b) of FIG. 8 are perspective views illustrating internal gears 130B and 130C according to modified examples. The internal gear 130B is provided with through holes 135Ba which penetrate the internal gear 130B on the widthwise opposite sides thereof so as to extend toward an internal surface 132B of a cylinder 131B.

The internal gear 130C is provided with through holes 135Ca at engagement concave portion 135C, which penetrate a central portion of the internal gear 130C so as to extend toward an internal surface 132C of a cylinder 131C.

The through holes 135Ba, 135Ca communicate with the cut grooves 210Aa of the case body 200A in the state where the internal gear 130B, 130C has been housed in the case body 200A. Thus, when the planetary gear mechanism 1A is in use, a lubricant or the like supplied from the external surface side of the case body 200A through the cut grooves 210Aa can be introduced into the planetary gear units 100A.

Although the present invention has been described in detail and with reference to its specific exemplary embodiments, it is obvious for those skilled in the art that various changes or modifications can be made on the invention without departing from the spirit and scope of the invention.

The present application is based on Japanese Patent Application No. 2016-126589 filed on Jun. 27, 2016, the contents of which are incorporated herein by reference.

DESCRIPTION OF REFERENCE NUMERALS AND SIGNS 1,1A,2 . . . planetary gear mechanism
100,100A . . . planetary gear unit
120,120A . . . sun gear
130,130A,130B,130C,130D . . . internal gear
130a,130Aa . . . outer circumferential surface
133 . . . internal teeth
135,136 . . . engagement convex portion (internal gear)
135A,135B,135C,135D . . . engagement concave portion (internal gear)
135Aa . . . step portion (engagement concave portion)
135Ba,135Ca . . . through hole
140 . . . planetary gear
150 . . . carrier
160 . . . output shaft
170 . . . spring
200,200A,200B,200C,200D . . . case body
200a . . . inner circumferential surface
210,220 . . . engagement concave portion
210A,210B,210C,210D . . . engagement convex portion
210Aa . . . cut groove (engagement convex portion)
210Ab . . . front end portion (engagement convex portion)
220,220A . . . threaded hole
300,300A . . . lid body

The invention claimed is:

1. A planetary gear mechanism comprising:
a plurality of planetary gear units each comprising a sun gear member to be rotationally driven by a driving source, an internal gear member, planetary gear members, and a carrier member; and
a case body that internally houses the planetary gear units and has an inner circumferential surface to be brought into surface contact with outer circumferential surfaces of the internal gear members,
wherein:
engagement portions having concave shapes or convex shapes that can be fitted to convex shapes or concave shapes formed in the outer circumferential surfaces of the internal gear members are formed in the inner circumferential surface of the case body,
the engagement portions having the convex shapes have cut and raised shapes or cut and drawn shapes provided with cut grooves, so that the engagement portions can be engaged with the concave shapes provided in the outer circumferential surfaces of the internal gear members to thereby inhibit the internal gear members from rotating, and
each of the internal gear members has through holes that penetrate the internal gear member from the outer circumferential surface thereof to the inner circumferential surface thereof so as to communicate with the cut grooves provided in the cut and raised shapes or the cut and drawn shapes of the case body.

2. The planetary gear mechanism according to claim 1, wherein:
the engagement portions are engaged with the convex shapes provided in the outer circumferential surfaces of the internal gear members, from an opposite direction to a rotating direction of the carrier members.

3. The planetary gear mechanism according to claim 1, wherein:
the cut and raised shapes or the cut and drawn shapes are engaged with the concave shapes provided in the outer circumferential surfaces of the internal gear members, from an opposite direction to a rotating direction of the carrier members, to thereby inhibit the internal gear members from rotating.

4. The planetary gear mechanism according to claim 1, wherein:
the cut and raised shapes or the cut and drawn shapes are engaged with the concave shapes provided in the outer circumferential surfaces of the internal gear members, from both a rotating direction of the carrier members and an opposite direction to the rotating direction, to thereby inhibit the internal gear members from rotating.

5. The planetary gear mechanism according to claim 1, wherein:
a plurality of the cut and raised shapes or the cut and drawn shapes are formed along the outer circumferential surface of each of the internal gear members.

6. The planetary gear mechanism according to claim 1, wherein:
the cut and raised shapes or the cut and drawn shapes are formed to be engaged with the concave shapes in different circumferential positions on the outer circumferential surface of each of the internal gear members respectively.

7. The planetary gear mechanism according to claim 1, wherein:
the cut and raised shapes or the cut and drawn shapes have different cut and raised heights or different cut and drawn heights so that the cut and raised shapes or the cut and drawn shapes can be engaged with the concave shapes provided in the outer circumferential surface of each of the internal gear members respectively.

8. The planetary gear mechanism according to claim 1, wherein:

there is a difference between one of the planetary gear units and another as to at least one of a module, a tooth number and a material.

9. The planetary gear mechanism according to claim 1, wherein:

threaded holes through which the case body can be fastened to a mounted body are formed in the case body.

10. The planetary gear mechanism according to claim 1, wherein:

the planetary gear units are housed while being urged in an axial direction of the case body by an urging member.

\* \* \* \* \*